Sept. 4, 1956 R. C. STEELE ET AL 2,761,357
MEANS FOR SHAPING SHEETS OF CELLULAR MATERIAL
Filed July 29, 1952 2 Sheets-Sheet 1
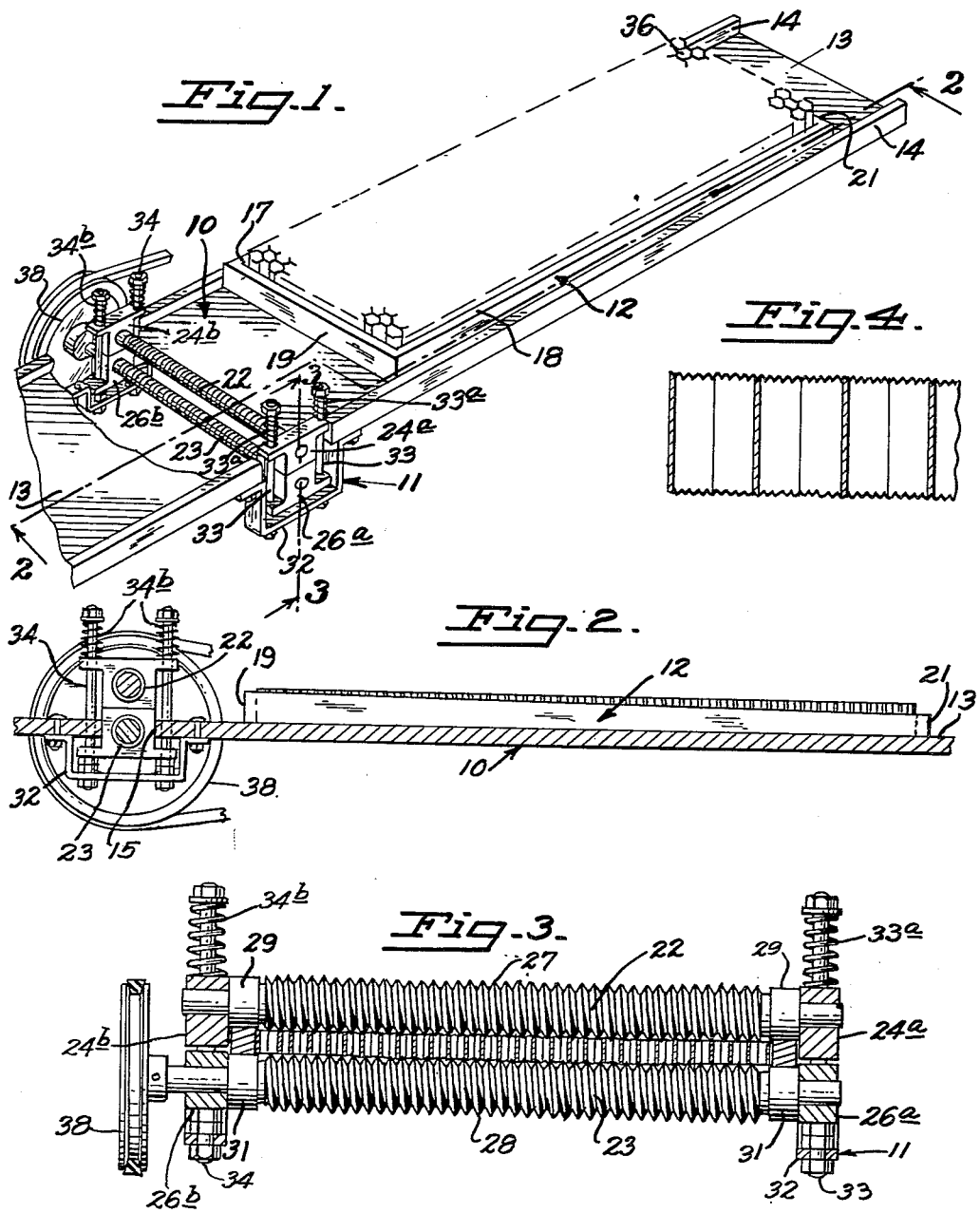
INVENTORS
ROGER C. STEELE
BY ROSCOE T. HUGHES
Townsend and Townsend
ATTORNEYS Sept. 4, 1956  R. C. STEELE ET AL  2,761,357
MEANS FOR SHAPING SHEETS OF CELLULAR MATERIAL
Filed July 29, 1952  2 Sheets-Sheet 2
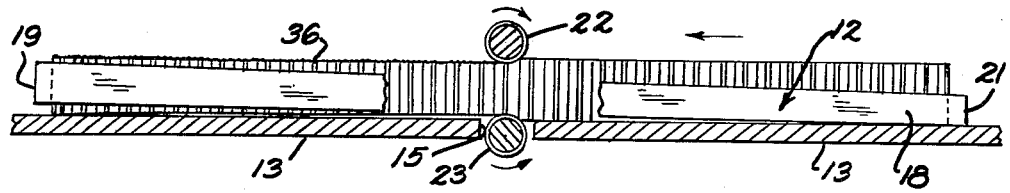
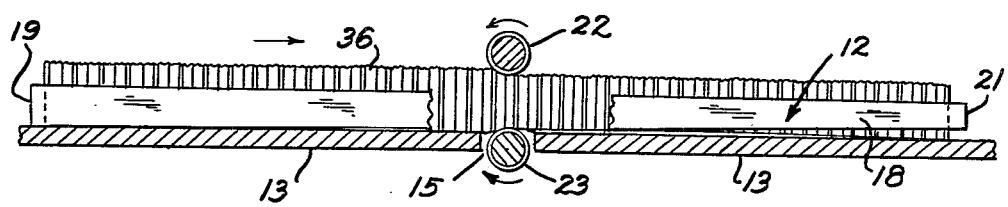
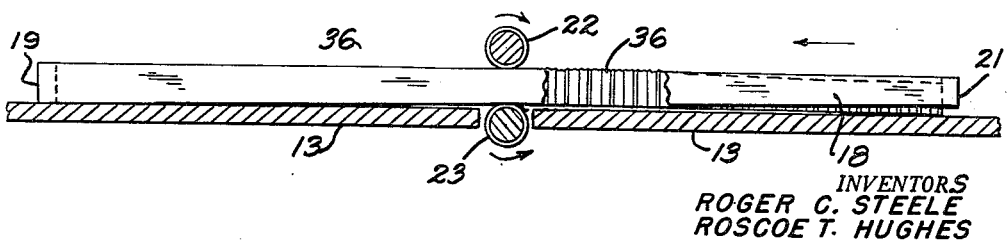
INVENTORS
ROGER C. STEELE
ROSCOE T. HUGHES United States Patent Office 2,761,357
Patented Sept. 4, 1956

2,761,357

MEANS FOR SHAPING SHEETS OF CELLULAR MATERIAL

Roger C. Steele, Berkeley, and Roscoe T. Hughes, Lafayette, Calif., assignors to Hexcel Products Inc., a corporation of California Application July 29, 1952, Serial No. 306,086

1 Claim. (Cl. 90—18)

This invention relates to a novel mechanism for shaping a sheet of honeycomb, or like cellular material, in the dimension of its thickness, and is a continuation in part of my copending application Ser. No. 173,871, filed July 14, 1950, now abandoned.

The particular embodiment of the mechanism illustrated in the drawings, and which will be described hereinafter in more detail, comprises, generally, a guideway in which is mounted a carrier for forwarding a sheet of cellular material between a pair of oppositely disposed cylindrical cutters or frayers. The cutters or frayers are adapted to cut into and remove material from opposite face surfaces of a sheet of material forwarded therebetween by said carrier. A profile cam, associated with said carrier, co-operates with a cam follower, associated with said cutters, to regulate the depth of permissible cut of said cutters and thereby control the ultimate shape of the sheet of material in the dimension of its thickness.

In the fabrication of radomes for aircraft made of honeycomb core material, it frequently becomes necessary to taper the honeycomb in the direction of its thickness within tolerances of (+) or (—) .008 inch. The apparent reason why it is sometimes essential in radome construction to taper the honeycomb within relatively narrow tolerances, is that micro-wave transmission through the radome housing is affected according to the thickness of the material and the angle of incidence with which the micro-waves strike the material. For example, if it is assumed that the radar housing is conoidal in form, and that the transmitting unit is located adjacent the base thereof, the micro-waves broadcast from the transmitter which strike the interior sides of the housing substantially perpendicular thereto will have less distance to travel through the housing than micro-waves which strike the interior sides of the housing at an oblique angle—assuming that the walls of the housing are of uniform thickness throughout. In order to compensate for the greater and lesser distances which the micro-waves would have to travel through the housing walls, the honeycomb core is tapered in the dimension of its thickness and in such manner that the thickness of the walls are less where the angle of incidence is greatest. Generally speaking, in such radome constructions the housing walls are made to taper from maximum to minimum thickness from base to top.

Heretofore there has not been developed a completely satisfactory way of tapering and/or shaping a honeycomb sheet in the dimension of its thickness within close tolerances, such as within the (+) or (—) .008 inch tolerance range required in radome construction. It is the principal object of the present invention, therefore, to provide a mechanism for shaping a sheet of honeycomb, of like cellular core material, in the dimension of its thickness and within close tolerances.

Although it is believed that the purposes and advantages of the present invention can be readily comprehended and appreciated with respect to radome housing manufacture, it is understood that the present invention is not limited to the art of making radomes or any specific types of cellular core structure.

Other objects and advantages of the present invention will become apparent upon reading the following specification and referring to the accompanying drawings in which similar characters of reference represent corresponding parts in each of the several views.

In the drawings:

Fig. 1 is a perspective view of an embodiment of the mechanism with portions thereof broken away.

Fig. 2 is an enlarged sectional view taken on line 2—2 of Fig. 1.

Fig. 3 is an enlarged sectional view taken on line 3—3 of Fig. 1.

Fig. 4 is an enlarged fragmentary side elevational view of a section of honeycomb showing the effects of the cutters thereon.

Figs. 5, 6, and 7 are partially schematic views showing the carrier and a sheet of honeycomb supported thereby during different stages of fabrication of said sheet employing the present mechanism.

Referring now more particularly to the drawings, the mechanism is shown as comprising, generally, a guideway or trough 10, a cutter assembly 11, and a carrier 12. The guideway 10 is shown as comprising an elongated trough including a table surface 13 slotted as at 15 and oppositely disposed upwardly projecting guide edges 14.

The carrier, heretofore indicated at 12, comprises a rectangular frame including oppositely disposed, identically formed, profile cams or bars 17 and 18, joined in parallel spaced relationship by end bars 19 and 21. The carrier, comprising elements 17, 18, 19, and 21, is mounted slidably movably within guideway 10 for reciprocal movement relative to cutter assembly 11.

The cutter assembly, heretofore designated generally at 11, preferably comprises a pair of oppositely disposed cylindrical cutters or frayers, indicated at 22 and 23, each being supported at its opposite ends transversely of the guideway by associated pairs of pillow blocks or bearings, indicated at 24a—24b and 26a—26b, respectively.

The cutters 22 and 23 may be constructed substantially identically to one another, and each is shown as consisting of a cylinder formed with a plurality of closely spaced cutting edges, which in turn may comprise closely spaced spiral threads formed around the periphery of the cylinders, indicated at 27 and 28, respectively. Cutting cylinders of the type shown are fully described in my above-identified copending application Ser. No. 173,871, now abandoned, wherein it is pointed out that the distance between adjacent cutting edges is preferably about 1/36 to 1/45 of an inch and that the depth of cut of the threads may be about 1/2500 of an inch. Each cutting cylinder is formed with a circular bearing surface at its opposite ends, such as are indicated at 29 and 31, which function as cam followers, as will more fully appear hereinafter.

The pillow blocks 24a—24b and 26a—26b support the cutting cylinders for relative reciprocal movement toward and away from one another. More specifically, the bottom pair of pillow blocks 26a and 26b may be anchored to table surface 13 by brackets, such as indicated at 32. Preferably, the pillow blocks 24a and 24b are anchored so as to support cutting cylinder 23 transversely of table 13 and with the upwardly disposed cutting edges thereof projecting slightly above the top surface of table 13, whereby the underside of a sheet of honeycomb material, such as indicated at 36, supported on the table and forwarded through the cutting cylinders, will be engaged by the cutting edges of the upwardly projecting portion of lower cylinder 23. Upper pillow blocks 24a—24b are mounted slidably on vertical guide rods 33 and 34, whereby it is seen that cutting cylinder 22 is supported for movement relatively toward and away from the fixed bottom cylinder 23. Compression springs 33a and 34b, mounted on the guide shafts above pillow blocks 24a—24b, function to normally spring bias said pillow blocks and associated cylinder 22 carried thereby downwardly toward cutting cylinder 23.

The profile cams, heretofore designated at 17 and 18, may be shaped and proportioned to present any desired profile. In the drawings said profile cams are shown as being tapered—the taper narrowing from front end bar 19 rearwardly toward back end bar 21 of the carrier frame 12. The carrier frame 12 is proportioned so that the profile cams 17 and 18 thereof vertically align with cam followers 29 and 31 of the cutting cylinders when said carrier is moved along guideway 10 and passed between the cutting cylinders.

The operation of the device is illustrated schematically in Figs. 5–7, inclusive. More specifically, Fig. 5 discloses a flat sheet of cellular material, such as honeycomb, carried loosely within the frame carrier assembly 12—it being noted that the thickness of the honeycomb sheet is greater than the thickest portion of the tapered profile bars. Thus, when the carrier assembly is passed between the cutting cylinders, the latter will operate against both the top and bottom faces of the cellular sheet and trim the sheet in the dimension of its thickness.

More specifically, it is seen that the arrangement is such that the underside of both profile cams 17 and 18 will always ride on associated cam followers 29 and 31; and because the top peripheries of the followers project a slight distance above the plane of table surface 13, said carrier will tend to ride up and over said followers during each passage of the carrier between said cutters. Moreover, because of the usual relative flexibility of the cellular material held loosely within the carrier, the sheet of material may exhibit a tendency to more or less drape itself over the bottom cylinder as shown. It is pointed out, however, that this will in no wise affect the practical efficiency or operativeness of the device.

The driving power for forwarding the sheet and carrier between the cutters may be supplied via pulley drive 38 connected to, and adapted to drive, lower cutting cylinder 23. Rotation of said cutting cylinder 23 will, because of its contact against the honeycomb sheet, cause said sheet and carrier to be moved along between said cutters. Movement of the sheet against the top cutting cylinder 22 will, in turn, cause said top cylinder 22 to rotate at the same peripheral speed as driving cylinder 23. In actual practice a sheet of cellular material maintained within the carrier may be reciprocated back and forth between the rollers simply by reversing the direction of rotation of lower drive cylinder 23. This may be accomplished simply by connecting the pulley belt drive 38 to a suitable conventional reversing mechanism (not shown) which can be conveniently operated to reverse the direction of the pulley drive. Reversing mechanisms capable of reversing the direction of belt drive 38 are well known in the art and do not, per se, constitute a part of the present invention. The cutting edges of the cylinders are preferably cut to a depth of about $\frac{1}{2500}$ of an inch, as aforesaid, which means, of course, that each time the sheet of material is passed between the rollers it will be reduced in thickness about $\frac{1}{1250}$ of an inch. If the cutting edges be cut to a depth exceeding $\frac{1}{2500}$ of an inch, the depth of cut into the material and the amount trimmed from the material during one pass through the machine will, of course, be correspondingly increased.

It is believed evident that as the material is repeatedly forwarded between the rollers and reduced in the dimension of its thickness, springs 33a and 34a will continuously urge top cylinder 22 down against the top of the sheet of cellular material and, because the sheet is mounted loosely within the carrier frame, this same spring force will continuously maintain the underside of the sheet pressed into cutting contact with associated bottom cylinder 23. The shape of the profile cams of the carrier assembly will, of course, determine the ultimate shape of the cellular material in the dimension of its thickness. More particularly, when the thickness of the honeycomb in any one area has been trimmed and reduced to an extent so as to equal the thickness of the profile cams, both top and bottom cam followers 29 and 31 of the cutters will bear against and ride on the profile cams and thereby be prevented from moving closer toward one another and consequently prevent the cutters from cutting any deeper into the material, regardless of the number of times the carrier is passed between the cutters. In this connection Fig. 7 shows the honeycomb sheet after one end area thereof has been shaped to comform with the thicker end portions of the tapered profile cams. It is evident that as the carrier is passed through the cutters, the latter will continue to operate against only those areas of the honeycomb which project either above or below the plane of the profile cams; and said cutters will, through the cam followers, ride on the profile cams opposite those areas of the material which have already been shaped correspondingly to said profile cams.

Although for purposes of convenient explanation and example profile cams 17 and 18 have been shown and referred to herein as having a tapered profile, it will be understood that said cams can be made to present practically any desired profile capable of being followed by the cam followers of the cutters. For this reason the particular shape or profile of the cams is not in itself considered as a limitation on the scope of the invention.

Although the present invention has been described in some detail by way of illustration and example for purposes of clarity of understanding, it is understood that certain changes and modifications may be made within the spirit of the invention as limited only by the scope of the claims appended hereto.

We claim:

A mechanism for shaping a sheet of cellular material in the dimension of its thickness comprising; a guideway comprising a table surface formed with a transverse slot, a carrier comprising a rectangular frame open at top and bottom and defining a sheet receiving recess for supporting loosely a sheet of cellular material to be shaped said frame being of less depth than the sheet to be shaped, a pair of vertically spaced cylindrical cutters disposed transversely and in vertical alignment with said slot and with the lower cutter disposed within said slot with its upper periphery extending slightly above the plane of said table surface; said cutters each defining a plurality of cutting edges adapted to cut into and remove cellular material moved into contact therewith, said cylindrical cutters mounted movably relatively toward and away from one another, resilient means normally resiliently biasing said cutters toward one another, said carrier movable reciprocably in said guideways between said cylindrical cutters adapted to forward opposite face surfaces of a sheet of material supported in said carrier into contact with said cutters, said carrier frame including a profile cam extending the full length of said sheet receiving recess having a surface profile corresponding to the desired profile of the sheet of cellular material to be shaped, said cam movable in timed relation with said carrier, a cam follower associated with at least one of said cutters engageable with said profile cam for controlling the maximum extent of permissible movement of said cutters relatively toward one another and for regulating the maximum depth of cut of said cutters into opposite face surfaces of said sheet corresponding to the profile of said profile cam during reciprocal movement of said carrier in said cutters.

References Cited in the file of this patent

UNITED STATES PATENTS

| 856,765 | Colvin et al. | June 11, 1907 |
| 975,839 | Dobbs | Nov. 15, 1910 |
| 1,277,891 | Evans | Sept. 3, 1918 |
| 1,551,178 | Strand | Aug. 25, 1925 |
| 1,698,637 | Kessler | Jan. 8, 1929 |